US009316561B2

(12) United States Patent
Dos-Reis et al.

(10) Patent No.: US 9,316,561 B2
(45) Date of Patent: Apr. 19, 2016

(54) DEVICE AND METHOD FOR MEASURING THE LEAKAGE RATE FROM REFERENCE PRESSURE LINES ONBOARD AN AIRCRAFT

(75) Inventors: Michel Dos-Reis, Plaisance du Touch (FR); Michel Bacou, Venerque (FR); Christophe Arruti, Aubiet (FR); Patrick Girard, Balma (FR)

(73) Assignee: AIRBUS OPERATIONS (SAS), Toulouse (FR)

( * ) Notice: Subject to any disclaimer, the term of this patent is extended or adjusted under 35 U.S.C. 154(b) by 468 days.

(21) Appl. No.: 13/878,056

(22) PCT Filed: Oct. 4, 2011

(86) PCT No.: PCT/FR2011/052303
§ 371 (c)(1),
(2), (4) Date: Sep. 17, 2013

(87) PCT Pub. No.: WO2012/045968
PCT Pub. Date: Apr. 12, 2012

(65) Prior Publication Data
US 2014/0053635 A1 Feb. 27, 2014

(30) Foreign Application Priority Data
Oct. 6, 2010 (FR) ...................................... 10 58089

(51) Int. Cl.
*G01M 3/28* (2006.01)
*B64F 5/00* (2006.01)
*F15B 19/00* (2006.01)
*G01M 3/00* (2006.01)
*G01M 3/26* (2006.01)

(52) U.S. Cl.
CPC ........... *G01M 3/2815* (2013.01); *B64F 5/0045* (2013.01); *F15B 19/00* (2013.01); *G01M 3/007* (2013.01); *G01M 3/26* (2013.01); *G01M 3/28* (2013.01)

(58) Field of Classification Search
CPC ....... G01M 3/26; G01M 3/28; G01M 3/2807; G01M 3/2815; B64F 5/0045; F15B 19/005
See application file for complete search history.

(56) References Cited

U.S. PATENT DOCUMENTS

| 2,310,974 A | 2/1943 | Lumm |
| 3,089,331 A | 5/1963 | Sharko et al. |
| 3,418,843 A | 12/1968 | Bosshart |
| 2007/0277754 A1* | 12/2007 | Dell'Eva ............. F16H 61/0009 123/90.12 |
| 2008/0006029 A1* | 1/2008 | Kitou .................... F15B 19/005 60/459 |

OTHER PUBLICATIONS

ISR, Dec. 6, 2011.

* cited by examiner

*Primary Examiner* — Paul West
(74) *Attorney, Agent, or Firm* — Greer, Burns & Crain, Ld.

(57) ABSTRACT

A device for testing pneumatic circuits and for measuring the leakage rate from reference pressure lines onboard an aircraft, connected to a plenum chamber. The device includes a multi-pressure system, comprising several sensors each connected to a reference pressure line, first solenoid valves arranged on the input channels to this multi-pressure system, and connected to the reference pressure lines through first connectors, second solenoid valves arranged on the reference pressure lines, a pressure controller module that is connected to all the first solenoid valves through a second connector, an electronic board that controls the solenoid valves and calibration of the multi-pressure system, a control device. The invention also relates to a method making use of this device.

10 Claims, 2 Drawing Sheets

DEVICE AND METHOD FOR MEASURING THE LEAKAGE RATE FROM REFERENCE PRESSURE LINES ONBOARD AN AIRCRAFT

CROSS-REFERENCES TO RELATED APPLICATIONS

This application claims the benefit of the French patent application No. 1058089 filed on Oct. 6, 2010, the entire disclosures of which are incorporated herein by way of reference.

BACKGROUND OF THE INVENTION

This invention relates to a device and a method for measuring a leakage rate from reference pressure lines onboard an aircraft, for example and airplane.

An airplane will be considered in the following description to simplify matters.

A stable reference pressure must be available when performing test flights on an airplane in order to make differential pressure measurements. Such a reference pressure is obtained using reference pressure lines (ZSR) or "reference lines" connected to a plenum chamber.

The leak tightness of reference lines has to be checked very frequently during test flights. If a leak occurs on such a line, all measurements that are referenced to this line will be wrong. No systematic check of these reference lines has been made up to now. Therefore it is impossible to date the beginning of these leaks. If such a leak occurs during a test flight, the flight will have to be repeated.

One purpose of the invention is a measurement method and a device to make the leak measurement on each reference pressure line before each test flight.

SUMMARY OF THE INVENTION

The invention relates to a device for testing pneumatic circuits and for measuring the leakage rate from reference pressure lines onboard an aircraft, connected to a plenum chamber, characterised in that it comprises:
- a multi-pressure system comprising several sensors each connected to a reference pressure line,
- first solenoid valves EV1 . . . EV15 arranged on the input channels to this multi-pressure system and connected to reference pressure lines through first connectors,
- second solenoid valves EVP1 . . . EVP15 arranged on the reference pressure lines,
- a pressure controller module that is connected to all the first solenoid valves through a second connector,
- an electronic board that controls the solenoid valves and calibration of the multi-pressure system,
- a control device in which software controls the device according to the invention.

Advantageously, all the second solenoid valves and the controller system are arranged in a thermostat-controlled housing.

Advantageously, the reference pressure of the multi-pressure system is the pressure in the plenum chamber to which it is connected through a pneumatic connection.

Advantageously, the multi-pressure system comprises 16 sensors, 15 sensors being connected to a reference pressure line and one sensor measuring a calibrated pressure to be injected.

Advantageously, the first solenoid valves are 2-channel/2-state valves identical to those used in the multi-pressure system.

Advantageously, the second solenoid valves have a through orifice diameter identical to or larger than the through orifice diameter of the reference pressure lines.

Advantageously, the voltage controller system outputs a pressure of several mbars, for example 8 mbars, greater than the pressure in the plenum chamber.

The invention also relates to a method for measuring the leakage rate from reference pressure lines onboard an aircraft, using such a device, and that comprises steps consisting of isolating the airplane pneumatic circuits, applying a determined pressure to them, measuring the pressure then obtained and then making a leak measurement on each reference line, such a test being done before each test flight.

Finally, the invention relates to an aircraft comprising such a device.

DETAILED DESCRIPTION OF THE PREFERRED EMBODIMENTS

Figure 1:
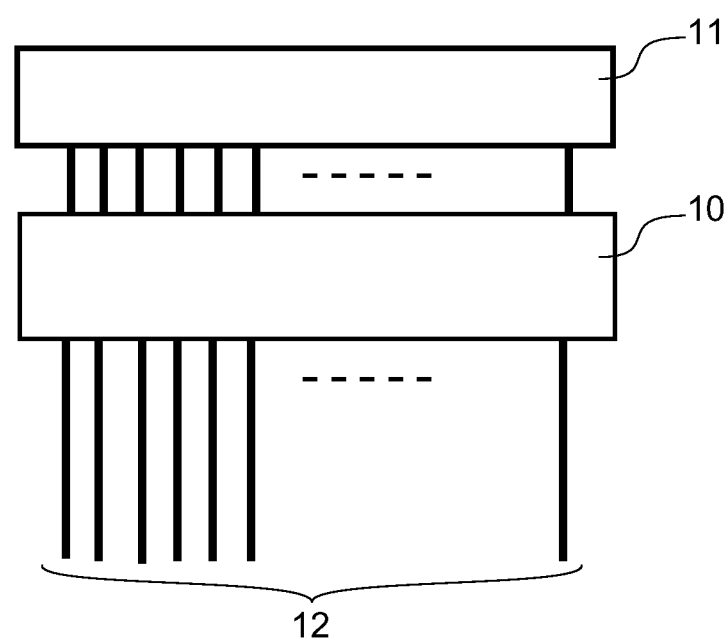
FIG. 1 diagrammatically shows the position of the device according to the invention onboard an airplane.

The device according to the invention is used close to fore and aft plenum chambers. As shown in FIG. 1, the device according to the invention 10 connected to such a plenum chamber 11 outputs sensor references 12.

The device according to the invention can be used to isolate all or some of the pneumatic circuits of an airplane so that they can be tested and the results plotted. It comprises an electronic board that determines the leakage rate from each reference line.

Figure 2:
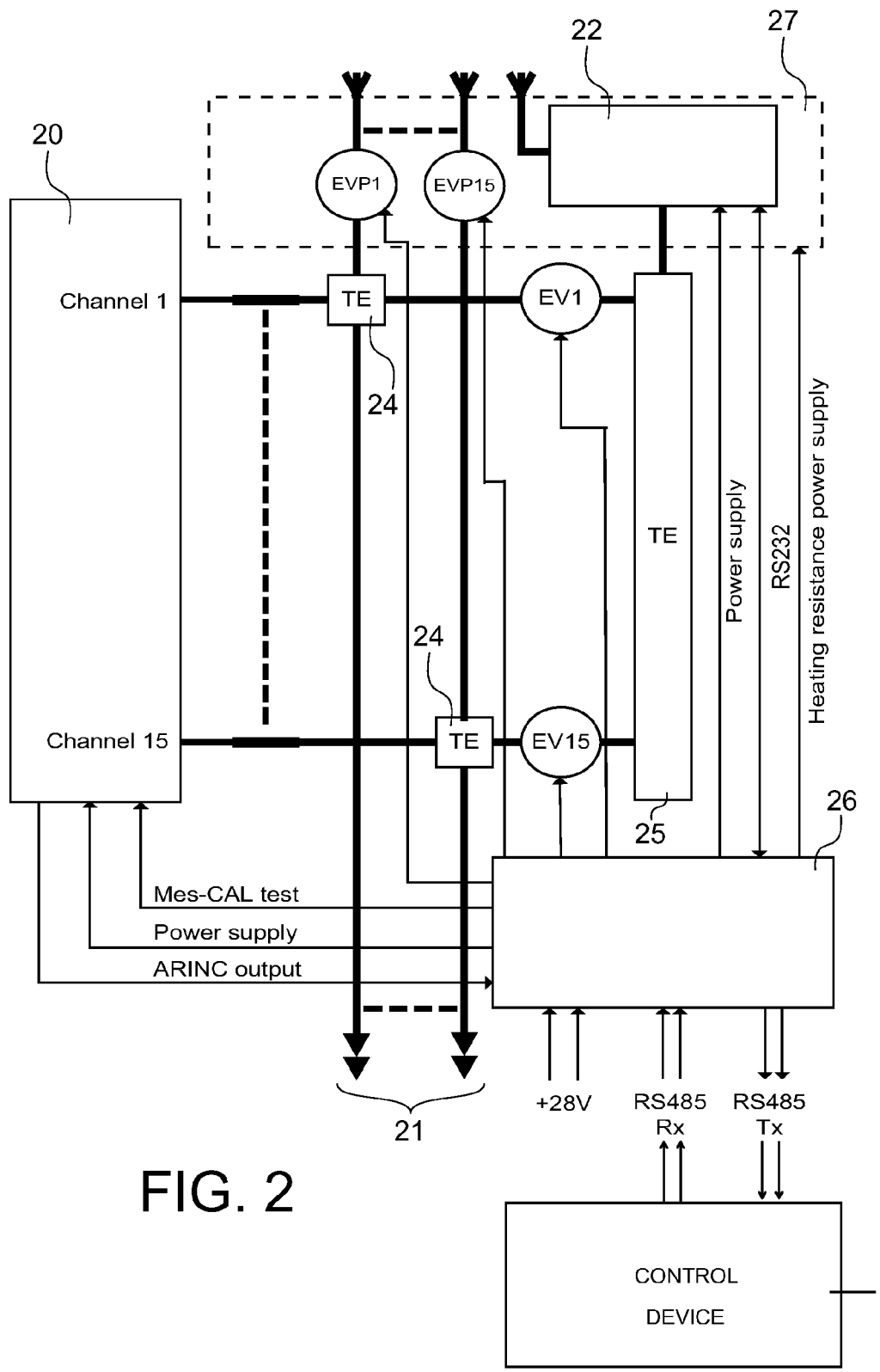
FIG. 2 shows the detailed internal mimic diagram of the device according to the invention.

FIG. 2 shows a detailed mimic diagram of the device according to the invention that comprises:
- a multi pressure system 20,
- first solenoid valves EV1 . . . EV15, arranged on the output channels from this system 20 that enable a calibrated pressure to pass in the reference lines 21 to which they are connected through first connectors TE 24, before the measurement,
- second normally open solenoid valves EVP1 . . . EVP15 arranged on the reference lines 21 to isolate the reference lines 21 to be tested,
- a pressure controller module 22 that makes it possible to obtain the calibrated pressure to be injected, that is connected to all first solenoid valves EV1 . . . EV15 through a second connector TE 25,
- an electronic board 26 that controls the solenoid valves and calibration of the measurement system,
- a control device 30, for example a laptop computer, connected to this electronic board 26, in which software controls the device according to the invention.

All second solenoid valves EVP1 . . . EVP15 and the controller module 22 are arranged in a thermostat-controlled casing 27, because they can be installed in the wing or in the hold of the airplane.

The reference pressure of the multi-pressure system 20 is the pressure in the plenum chamber to which it is connected through a pneumatic connection not shown in the figure. This multi-pressure system 20 may for example be a housing H 493 made by the General Electric Company. 16 sensors from this system can then be used, each of the 15 sensors being connected to a reference line, and one sensor being used to measure the calibrated pressure to be injected.

The first 15 solenoid valves EV1 ... EV15 are 2-channel/2-state valves identical to those used in the multi pressure system 20.

The second 15 solenoid valves EVP1 ... EVP15 have a passage orifice diameter identical to or larger than the passage diameter of the reference lines 21.

The pressure controller module 22 outputs a pressure equal to 8 mbars higher than the outside pressure, in other words the pressure in the plenum chamber.

The device according to the invention is used to isolate the airplane pneumatic circuits, apply a determined pressure, measure the pressure obtained and indicate the leakage rate from each reference line.

The electronic board 26 is controlled through the RS link of the control device 30. The electronic board 26 sends power supply and test (Test-Mes-Cal) signals to the multi pressure system 20 and it receives an ARINC output signal from it. It sends power supply signals to the thermostat-controlled casing 27 and power supply signals to heating resistances of this thermostat-controlled casing 27 and is connected to it through an RS232 type connection. The device according to the invention is controlled, and therefore measurement acquisition and alerts are made using this casing. It is thus possible to individually or collectively (by pair, group, etc.) select opening/closing of solenoid valves depending on the tests to be made. Indeed, it may be necessary to test all reference lines simultaneously to see if there is a leak. Such an operation can be done quickly and these reference lines can thus be tested quickly. An individual test of the reference lines can be made if a leak is detected, in order to determine which line is leaking. The multi pressure system 20 is always in the measurement position.

One channel of the multi pressure system 20 is used to check that the injected pressure is actually equal to the required value.

The device according to the invention can function within a temperature range from −55° C. to +80° C.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A device for testing a pneumatic circuit and for measuring a leakage rate from the pneumatic circuit onboard an aircraft, connected to a plenum chamber, comprising:
a multi-pressure system including at least one sensor, each sensor connected to a corresponding reference pressure line;
a plurality of first solenoid valves, each first solenoid valve arranged on a corresponding input channel to the multi-pressure system, and connected to the corresponding reference pressure line through a first connector that connects the corresponding reference pressure line and the corresponding input channel;
a plurality of second solenoid valves, each second solenoid valve arranged on the corresponding reference pressure line, separately interconnecting each reference pressure line with the corresponding input channel via the first connector having a plurality of connection points for fluidically communicating between the corresponding reference pressure line and the corresponding input channel;
a pressure controller module that is connected to all of the plurality of first solenoid valves through a second connector;
an electronic board that controls the first and second solenoid valves and calibration of the multi-pressure system; and
a control device operatively connected to the electronic board.

2. The device according to claim 1, in which all the second solenoid valves and the pressure controller module are arranged in a thermostat-controlled housing.

3. The device according to claim 1, in which a reference pressure of the multi-pressure system is a pressure in the plenum chamber, to which it is connected through a pneumatic connection.

4. The device according to claim 1, in which the multi-pressure system comprises 15 sensors, each being connected to a reference pressure line, and another sensor measuring a calibrated pressure to be injected.

5. The device according to claim 1, in which the plurality of first solenoid valves are 2-channel/2-state valves.

6. The device according to claim 1, in which the second solenoid valves are solenoid valves having a through orifice diameter identical to or larger than a through orifice diameter of the reference pressure lines.

7. The device according to claim 1, in which the pressure controller module outputs a pressure greater than the pressure in the plenum chamber by a predetermined number of mbars.

8. The device according to claim 1, in which the aircraft is an airplane.

9. A method for testing a pneumatic circuit and for measuring a leakage rate from the pneumatic circuit onboard an aircraft, the method comprising:
isolating the pneumatic circuit;
connecting at least one sensor to a corresponding reference pressure line;
applying a determined pressure to the pneumatic circuit;
arranging a plurality of first solenoid valves, such that each first solenoid valve is arranged on a corresponding input channel, and connecting the input channel to the corresponding reference pressure line through a first connector that connects the corresponding reference pressure line and the corresponding input channel;
arranging a plurality of second solenoid valves, such that each second solenoid valve is arranged on the corresponding reference pressure line, and separately interconnecting each reference pressure line with the corresponding input channel via the first connector having a plurality of connection points for fluidically communicating between the corresponding reference pressure line and the corresponding input channel;
measuring a pressure obtained from the pneumatic circuit;
measuring a leak from the reference pressure line.

10. An aircraft comprising a device for testing a pneumatic circuit and for measuring a leakage rate from the pneumatic circuit onboard an aircraft, connected to a plenum chamber, the device comprising:
a multi-pressure system including at least one sensor, each sensor connected to a corresponding reference pressure line;
a plurality of first solenoid valves, each first solenoid valve arranged on a corresponding input channel to the multi-pressure system, and connected to the corresponding reference pressure line through a first connector that connects the corresponding reference pressure line and the corresponding input channel;

a plurality of second solenoid valves, each second solenoid valve arranged on the corresponding reference pressure line, separately interconnecting each reference pressure line with the corresponding input channel via the first connector having a plurality of connection points for fluidically communicating between the corresponding reference pressure line and the corresponding input channel;

a pressure controller module that is connected to all of the plurality of first solenoid valves through a second connector;

an electronic board that controls the first and second solenoid valves and calibration of the multi-pressure system; and a control device operatively connected to the electronic board.

* * * * *